United States Patent

[11] 3,575,377

| [72] | Inventors | Sydney E. Carlton<br>Gladstone;<br>Max L. Moody, Portland, Oreg. |
|---|---|---|
| [21] | Appl. No. | 801,063 |
| [22] | Filed | Feb. 20, 1969 |
| [45] | Patented | Apr. 20, 1971 |
| [73] | Assignee | Willamette Iron and Steel Company,<br>a Division of Guy F. Atkinsoa Co.<br>Portland, Oreg. |

[54] CLOSURE SEAL FOR GATE VALVE AND METHOD
9 Claims, 5 Drawing Figs.

[52] U.S. Cl. .................................................... 251/176,
137/242, 251/175, 251/327, 251/329
[51] Int. Cl. ............................................................ F16k 3/18
[50] Field of Search............................................. 251/175,
174, 176, 357, 326, 327, 328, 329; 137/242

[56] References Cited
UNITED STATES PATENTS

| 3,002,525 | 10/1961 | Grove | 251/176X |
| 2,950,897 | 8/1960 | Bryant | 251/174X |
| 3,033,515 | 5/1962 | Brisbane | 251/175 |
| 3,047,266 | 7/1962 | Ver Nooy | 251/175 |
| 3,069,129 | 12/1962 | Grove | 251/175 |
| 3,130,952 | 4/1964 | Meyer | 251/175 |
| 3,241,807 | 3/1966 | Holderer | 251/175X |
| 3,295,546 | 1/1967 | Carlton | 137/242 |
| 3,310,283 | 3/1967 | Carlton | 251/357 |

FOREIGN PATENTS

| 946,514 | 1/1964 | Great Britain | 251/176 |

Primary Examiner—Clarence R. Gordon
Attorney—Henry Gifford Hardy

ABSTRACT: This invention is concerned with the structure of the gate in a fabricated gate valve where the gate is moved vertically to the open or closed position as the case may be, and is directed primarily to the method and means for effecting the closure seal of the gate. The closing portion of the gate is counterbored in stepped relation on both faces with an annular deeper portion forming a socket adjacent the periphery of the bore. A loosely fitting sealing disc is inserted into the counterbore, without bottoming, and in sealing relation with the cut of the counterbore at its perimeter. The sealing in the closed position is accomplished by an annular O-ring in the face of the sealing disc engaging in the area of the inner end of the through flow pipe segment of the valve body and the line pressure acting on the inner face of the disc having an area larger than the area of the cross section of the flow.

Patented April 20, 1971

INVENTORS
SIDNEY E. CARLTON
MAX L. MOODY
BY Henry Gifford Hardy
Attorney.

Patented April 20, 1971

INVENTORS
SIDNEY E. CARLTON
MAX L. MOODY

BY

CLOSURE SEAL FOR GATE VALVE AND METHOD

The invention disclosed and claimed herein is directed primarily to the solid or closing portion of a gate valve. Its advantages of the structure are numerous, but most are found in the far better operation of gate valves such as reduction of torque and in opening and closing more reliability in the valve itself such as positive fluidtight seal, and greatly reduced manufacturing costs especially in the elimination of the necessity for close tolerances in a conventional gate valve. The reduction of O-ring wear effected is an important contribution as this alone provides advantages in maintenance.

The forms of gate shown here are adaptable for uniflow service or for multiple product service.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without department from the spirit thereof or the scope of the appended claims.

IN THE DRAWINGS

Figure 1:
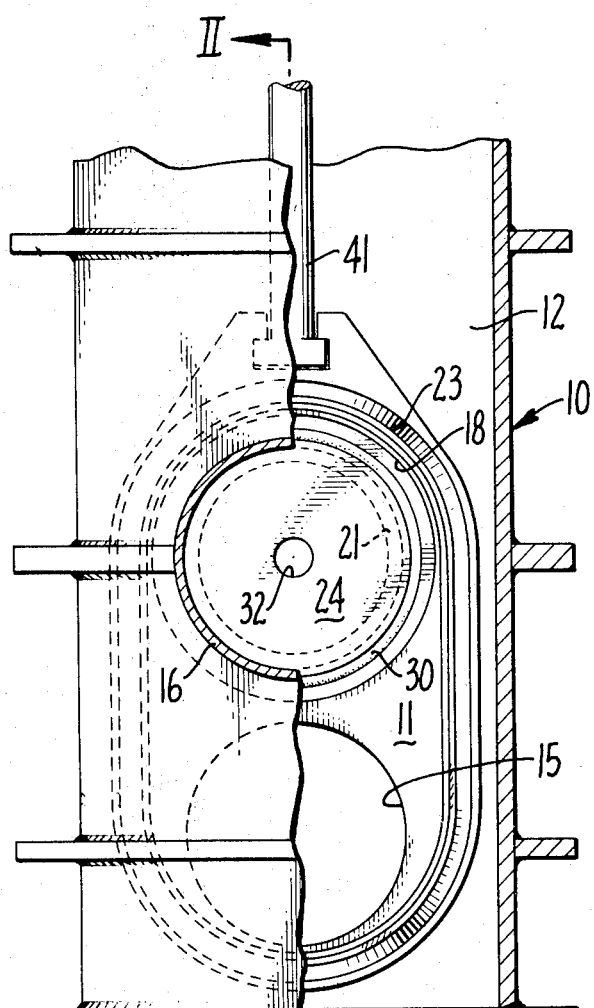
FIG. 1 is a front elevational view of the fabricated gate valve and the gate which is the subject hereof, with the right-hand portion thereof shown in section.
Figure 2:
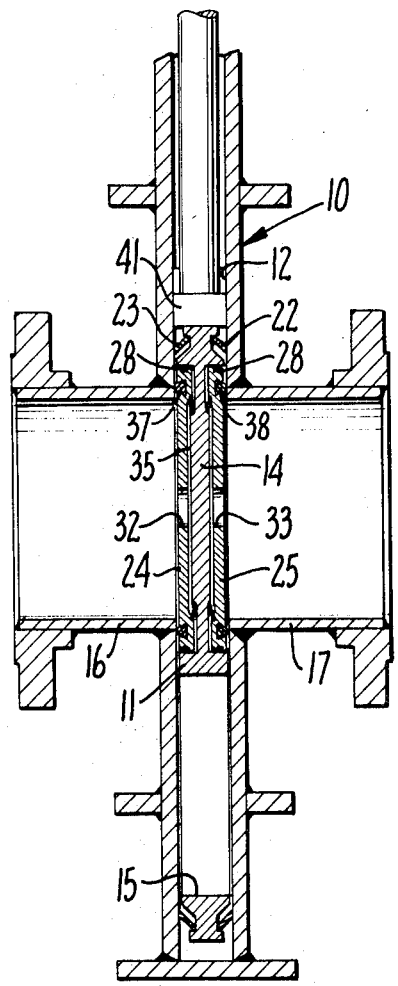
FIG. 2 is a vertical section of the valve and gate taken on the line II—II of FIG. 1.

Referring now more particularly to the drawings in which like reference numerals refer to the same or similar parts in the several views, it will be observed from FIGS. 1 and 2 that the gate valve in question is a fabricated valve of the type more fully disclosed in U.S. Pat. No. 3,295,546. The improvement here is directed to the gate structure for the valves, with particular reference to the solid portion 14 of the gate useful for shutting off the flow in the closed position, on one or both sides. The valve is generally designated 10 with the gate 11 moving in a vertical plane within the narrow body chamber 12. As is more particularly shown and described in U.S. Pat. No. 3,295,546, the gate 11 has two portions, the upper portion 14 being solid for shutting off the flow through the valve in the closed position, with the lower portion having an opening 15 of the same diameter as the pipe segments 16 and 17 so that there is a continuous unobstructed flow through the valve in the open position.

The solid portion of the gate 14 is counterbored on both sides or faces in stepped relation. The greater diameter on each face of the gate is represented by the vertical deeper cut 18 and a shallower cut of lesser diameter represented by the curved cut 20. The solid portion 14 of the gate 11 represents a considerable thickness to minimize warping or distortion of this portion in the fabrication of the gate. Both sides of the area 14 are equal and the diameter represented by the cuts 18 are substantially greater than the sectional area represented by the internal diameter of the pipe segments 16 and 17 through which the flow of the valve is directed when the valve is opened in use. It is less, however, than the top diameter of scraper rings or Carlton rings 22 and 23, which bear against the inner faces of the body chamber 12 at opposite sides.

Identical discs 24 and 25 are made in a diameter sufficient to loosely fit within the annular face defined by the counterbore 18. They are less in thickness than the depth of the face 18. The plates 24 and 25 are known as "dollar plates." Each plate 24 and 25 is provided with a peripheral groove 27 to receive O-rings 28. The O-rings 28 bear against the face of the vertical cut 18 and make a fluidtight seal between the discs or dollar plates 24 and 25 and the wall 18. This is one of the two important seals provided by this structure. The discs 24 and 25 also have an annular internal and peripheral raised land portions 19 which fit within the cavity defined by the deeper cut 18 but which do not bottom therein and do not extend up to the curved cut 20. In the space between the lands 19 and the curved cut 20 is a ring flexible spacer 21. The purpose and function of each of these elements will be further explained.

The second seal is on the outer face of each disc. On such face of each of the dollar plates 24 and 25, there is an O-ring groove 30 and 31. These are preferably of the shape more fully disclosed and described in U.S. Pat. No. 3,310,283, having a double curve to the sidewalls, with the upper curves on a different center from the lower curves. Such a shape gives better performance and minimizes rolling and twisting, therefore resulting in longer life to the O-ring, although the conventional O-ring groove and the narrowing sloping grooves of FIGS. 4 and 5 have been found satisfactory. It will be observed from FIGS. 2, 3, 4 and 5, that the O-ring groove 30 and 31 represent a diameter greater than the inner diameter of the pipe segments 16 and 17. Conventional O-rings 37 and 38 are placed within the said grooves. In the closed position, the O-rings 37 and 38 are well beyond or outside of the inner diameter of the pipe segments 16 and 17, as shown in all of the FIGS. and within the body cavity 12.

In the center of each dollar plate 24 and 25 is a through-port 32 and 33 respectively. In some services the through-ports 32 and 33 may be covered with a screen 34 which is shown in position only on dollar plate 24 in FIG. 5 by way of example.

The dollar plates are supported within the counterbore 18 by the flexible spacers 21 and keep the dollar plates 24 and 25 from resting on the bottom of the counterbored cavity of the solid portion 14 of the gate 11. In this manner there is always a space 35 between the dollar plates 24 and 25 and the gate portion 14. As will be observed in the drawings, the space 35 is always in communication with and subject to the line pressure, if any, through ports 32 and 33.

OPERATION

Figure 3:
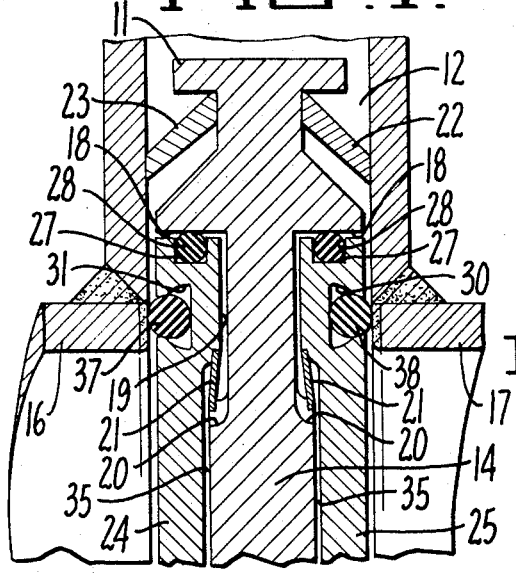
FIG. 3 is an enlarged fragmentary vertical section of the upper portion of the gate, closed but not in sealing engagement.

Referring now to FIGS. 2 and 3, the gate valve 10 shown is in the closed position under zero pressure from either side. The dollar plates 24 and 25 rest easily on body areas 12 with slight predeterminal pressures on the O-rings 37 and 38. The O-rings 28 in grooves 27 provide a constant contact in sealing engagement with the surface 18 and form a bubble-proof engagement at all times. There is very little loading on the O-rings 28 and O-rings 37 and 38. Once the initial loading has been made, there is very little load and this low compression loading minimizes the wear over a great number of cycles. In fact, the wear becomes almost unmeasurable for the remaining life of the valve due to the controlled pressure loading. O-rings that are in constant contact with the sealing areas under controlled pressure presents an ideal technique in which to produce a zero pressure seal O-ring application.

Figure 5:
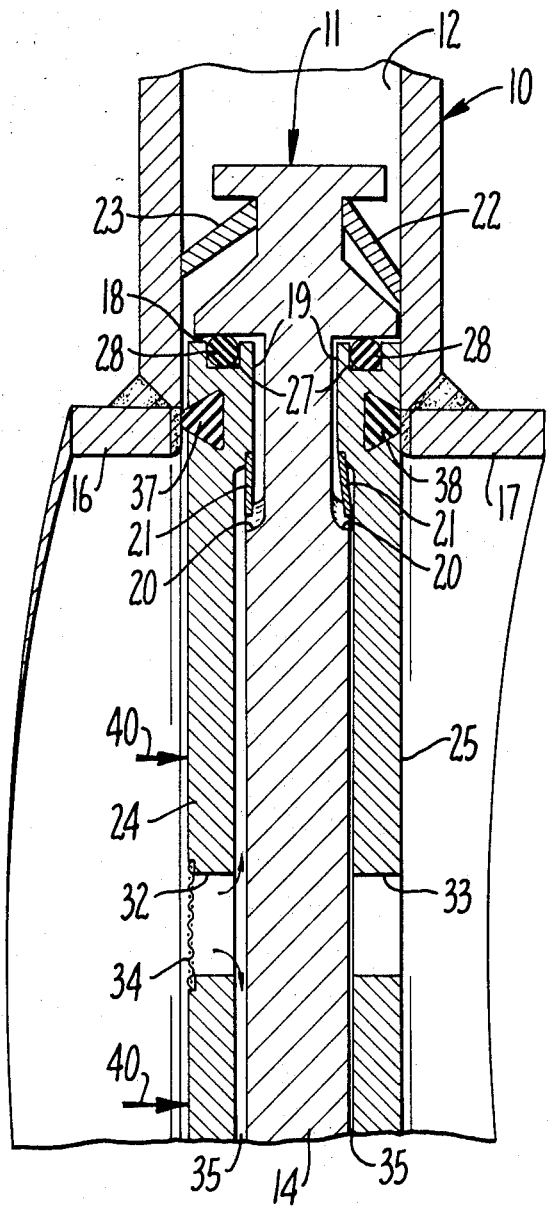
FIG. 5 is an enlarged fragmentary section of the gate in the closed position with primary sealing only on the upstream side, and a secondary sealing on the downstream side.

In the closed position shown in the drawings, the use of dollar plates 24 and 25, produces two forms of seals in the gate valves of the type referred to herein. The first of these is a unidirectional flow with upstream seal shown more particularly in FIG. 5. The line pressure to the valve is represented by the arrows 40. In FIG. 5, the pressure against the face of dollar plate 24 pushes it against pressure exerted by spacer 21. The line pressure is transmitted through the aperture 32 onto the inner face of the dollar plate 24, which has a larger area than the inner diameter of the pipe segment 16. The seal of O-ring 28 confines the pressure behind the plate. This will force the dollar plate 24 against the line pressure indicated by the arrow, forming a seal by O-ring 37 against body area 12. The line pressure is also exerted on the upstream face of the gate portion 14. This forces the gate 11 toward the downstream side and causes a secondary sealing engagement of the O-ring 38 against the wall of the chamber 12 beyond the juncture between the wall of the body chamber 12 and the pipe segment 17. The initial urging of the upstream dollar plate unto the body has allowed maintaining an upstream seal during movement of the center piece to the downstream side. In the closed position, as long as there is line pressure in the direction of the arrow 40, the primary sealing will take place on the upstream side, as indicated in FIG. 5. Thus, between the sealing by the peripheral O-ring 28 and the annular O-ring 37, a bubble-tight seal is produced on the upstream side. Any pressure building in the body cavity 12 due to any reason will then be relieved to downstream or low pressure side of the line through the opposite sealing O-ring 38 in the face of disc 25, with sealing effected immediately following relief of the expanded pressure.

In the event the fluid passing through the line contains suspended or entrained solids, it may be useful to provide a screen 34 in the aperture 32. This will prevent the accumulation of solids behind the dollar plate 24 in the space 35 between it and the gate 14. The screen 34 is self-cleaning because each time the gate is cycled the movement of fluid therethrough in the opening and closing procedures, will flush any collection of sediment or solids tending to build up on the face or front of the screen 34 and reflushing will release material caught by the screen 34 to keep it from plugging.

Figure 4:
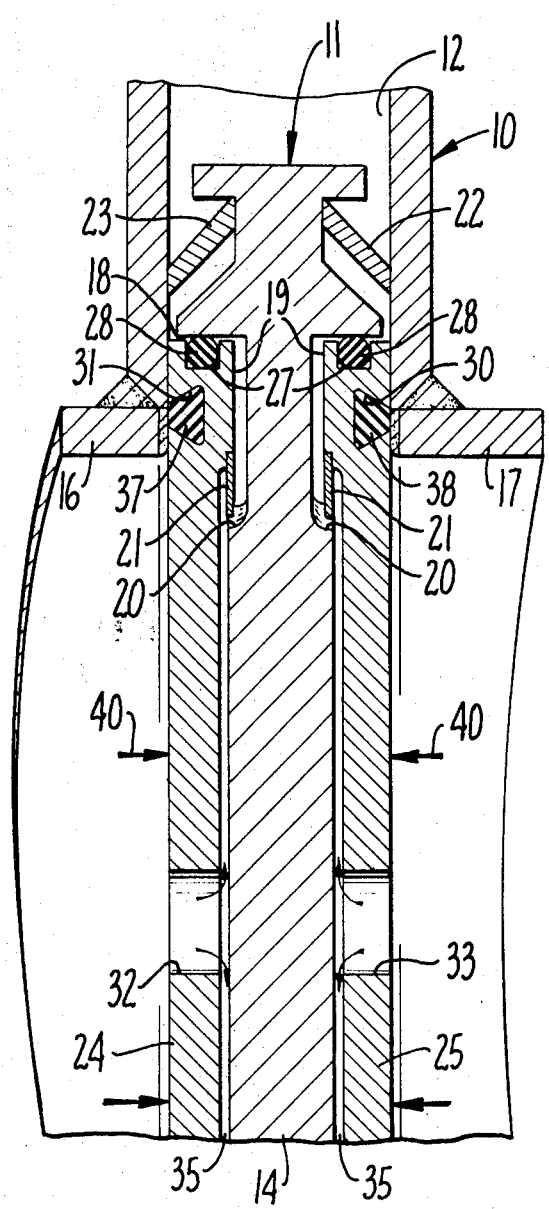
FIG. 4 is an enlarged fragmentary view of the gate in closed position showing the sealing on both sides of the gate.

The multiple product service for the valve is shown in FIG. 4. The pressure 40 is on both sides and enters through the central apertures 32 and 33 in the dollar plates 24 and 25 respectively, and thence to the chambers 35 behind the dollar plates. The initial contact of O-rings 37 and 38 is due to the spacer rings 21 which urge the plates outwardly to provide a seal with the body cavity 12, thereby allowing pressure buildup in chamber 35 for absolute seal at O-rings 37 and 38. The annular O-rings 37 and 38 seal against the opposite inner faces of the chamber 12. This effects a double block and bleed seal. In this instance should a fire occur causing damage to the O-ring seal provided by the rings 37 and 38, a metal-to-metal seal results from this pressure on the dollar plates themselves, providing a safety measure for the protection of the plant equipment. Any excess pressure in the valve body 12 is automatically relieved by the use of dollar plate with the flexible spacer rings 21 as any such buildup of pressure would gradually escape into the line itself, past O-ring seals 37 and 38.

It will be observed that there is a very low compressive loading of the O-rings 37 and 38 so that these seals have an unusual life span. It will also be observed that the apertures 32 and 33 aided by gentle urging of flexible spacer rings 21, prevent a vacuum lock occuring between the dollar plates and the gate portion 14. The use of dollar plates with flexible spacers 21 according to tests have produced very important results: it provides a gate valve with a primary and secondary seal with controlled O-ring loading resulting in greatly increased seal life for both unidirectional and block and bleed valves. It assures body relief in unidirectional valves, of any increase in body pressure when closed, into the low pressure side of the line. Once the valve is cracked open, loading due to the pressure behind the dollar plates becomes balanced thereby greatly reducing the effort or force required to position the valve to full open. Another important factor is it greatly reduces the requirement for close tolerances in the manufacture of the body and gate and thus permits a substantial reduction in the cost of manufacturing.

It will be observed that a space or cavity is provided behind the said dollar plates 24 and 25 of a dimension which will prevent a vacuum lock of the plates and the gate while at the same time insuring a minimum contact of the plates to the gate. Also, once the gate is started to open i.e. by rotation of the stem 41, the pressure on the dollar plates is balanced thus allowing very easy opening and closing.

We claim:

1. A gate for a fabricated gate valve having a lower portion with an opening therethrough of the same diameter as the through flow pipe and an upper solid portion for blocking the flow through a valve, said solid portion having substantially equal counterboring over the entire area on both sides of greater diameter than the flow when positioned in the closed position with a valve, discs loosely fitting within said counterbore without bottoming therein and having a central opening therethrough, peripheral sealing means on said discs for sealing engagement with the peripheral walls of said counterbores, and sealing means on the outer face of each disc of larger diameter than the flow but less than the diameter of the discs.

2. The gate of claim 1 wherein the counterboring is annularly deeper at the perimeter.

3. The gate of claim 1 wherein the counterboring is annularly deeper at the perimeter and wherein the discs have an annular land on their inner faces at the perimeter thereof but not as wide as the annular cut of the counterbore.

4. The gate of claim 3 wherein there are a flexible spacer rings inwardly of disc lands and extending adjacent to the inner perimeter of deeper annular portions of the counterbores. with the peripheral walls of said counterbores, and sealing means on the outer face of each disc of larger diameter than the flow but less than the diameter of the discs.

5. A fabricated gate valve having a narrow internal body cavity for the vertical movement of the gate and a flow through passage, a gate for said valve, said gate having a solid portion for blocking the through flow when in the closed position and an opening therethrough corresponding to the diameter of the through flow when in the open position, said closing portion of the gate having substantially equal counterboring in each opposite face over the entire area greater than the diameter of the flow in the closed position, disc means loosely filling in each of the counterbores without bottoming therein, said discs having an O-ring groove and seal in the perimeter for sealing between the edge of the disc and the peripheral wall of the counterbore and an O-ring groove and seal on the outer face thereof of a diameter larger than the through flow passage but not as large as that of the counterbore for sealing in the valve cavity in the closed position, said discs also having an axial opening therethrough, and means for raising and lowering the gate within the valve body cavity from the open to the closed positions and vice versa.

6. The gate valve of claim 5 wherein the counterbore in each face of the gate is annularly deeper adjacent the perimeter.

7. The gate valve of claim 5 wherein the counterbore in each face of the gate is annularly deeper adjacent the perimeter thereof and where the discs have annular lands on their inner faces but not as wide as the annular bore which receives them.

8. The gate valve of claim 7 wherein there is a resilient spacer ring between the inner diameter of the lands and the inner diameter of the annular deeper portion of the counterbore.

9. The gate valve of claim 8 wherein the spacer rings are biased to urge the discs into sealing relation with the valve cavity in the closed position.